(12) United States Patent
Tamura et al.

(10) Patent No.: US 10,693,349 B2
(45) Date of Patent: Jun. 23, 2020

(54) LIFE ESTIMATION SYSTEM

(71) Applicant: SUMITOMO HEAVY INDUSTRIES, LTD., Tokyo (JP)

(72) Inventors: Mitsuhiro Tamura, Kanagawa (JP); Akira Yamamoto, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/173,790

(22) Filed: Oct. 29, 2018

(65) Prior Publication Data

US 2019/0140526 A1    May 9, 2019

(30) Foreign Application Priority Data

Nov. 9, 2017   (JP) ................. 2017-216083

(51) Int. Cl.
| | |
|---|---|
| *H02P 7/00* | (2016.01) |
| *H02K 11/35* | (2016.01) |
| *F16H 1/00* | (2006.01) |
| *H02K 15/00* | (2006.01) |
| *H02K 11/24* | (2016.01) |
| *H02K 11/27* | (2016.01) |
| *H02K 7/116* | (2006.01) |
| *H02K 11/33* | (2016.01) |

(52) U.S. Cl.
CPC .............. *H02K 11/35* (2016.01); *F16H 1/00* (2013.01); *H02K 7/116* (2013.01); *H02K 11/24* (2016.01); *H02K 11/27* (2016.01); *H02K 15/00* (2013.01); *H02K 11/33* (2016.01)

(58) Field of Classification Search
CPC ................................ H02K 11/35; H02K 11/24
USPC ....................................................... 318/432
See application file for complete search history.

(56) References Cited

U.S. PATENT DOCUMENTS

| | | | | |
|---|---|---|---|---|
| 5,210,704 A | * | 5/1993 | Husseiny | ............... G01H 1/003 702/34 |
| 6,777,901 B2 | * | 8/2004 | Susono | ................... H02K 7/116 180/65.1 |
| 7,914,250 B2 | * | 3/2011 | Behera | ............... G05B 23/0283 415/1 |
| 2004/0122618 A1 | * | 6/2004 | Suzuki | ..................... G07C 3/00 702/181 |

FOREIGN PATENT DOCUMENTS

JP     2003-088178 A    3/2003

* cited by examiner

*Primary Examiner* — Erick D Glass
(74) *Attorney, Agent, or Firm* — Michael Best & Friedrich LLP

(57) ABSTRACT

The life estimation system is a life estimation system that estimates a life of the reduction gear including a reduction mechanism. The life estimation system includes a sensor that is to be mounted onto the reduction gear and detects information for identifying a stress generated in a specific part of the reduction gear, and an estimating unit that identifies the stress generated in the specific part based on detection information obtained by the sensor and estimates the life of the specific part based on the identified stress.

13 Claims, 4 Drawing Sheets

LIFE ESTIMATION SYSTEM

RELATED APPLICATIONS

Priority is claimed to Japanese Patent Application No. 2017-216083, filed Nov. 9, 2017, the entire content of which is incorporated herein by reference.

BACKGROUND

Technical Field

A certain embodiment of the present invention relates to a life estimation system that estimates a life of a reduction gear.

Description of Related Art

A technique for detecting the presence or absence of an abnormality of a reduction gear is disclosed in the related art. According to this technique, a stopping time of a machine can be shortened to some extent since a breakdown that has occurred can be detected in a relatively early stage.

SUMMARY

According to an aspect of the invention, there is provided a life estimation system that estimates a life of a reduction gear including a reduction mechanism. The life estimation system includes a sensor that is mounted onto the reduction gear and detects information for identifying a stress generated in a specific part of the reduction gear and an estimator that identifies the stress generated in the specific part based on detection information obtained by the sensor and estimates a life of the specific part based on the identified stress.

Any combination of the configuration elements described above, or an embodiment, in which a configuration element or description of the invention is switched between methods, devices, and systems, is also effective as an aspect of the invention.

DETAILED DESCRIPTION

A reduction gear is incorporated in various machines. A breakdown of the reduction gear may cause a machine in which the reduction gear is incorporated to stop.

If it is possible to estimate a life of the reduction gear, a stopping time of the machine, which is caused by a breakdown of the reduction gear can be further shortened.

It is desirable to provide a life estimation system that can estimate the life of a specific part of the reduction gear in a relatively accurate manner.

Hereinafter, the same or equivalent configuration elements, members, and processes, which are illustrated in each drawing, will be assigned with the same reference symbols and overlapping description will be omitted as appropriate. The dimension of a member in each drawing is enlarged or reduced as appropriate in order to facilitate the understanding. In addition, some of members that are not important in describing an embodiment will be omitted in each drawing.

Circumstances under which a life estimation system according to the embodiment is devised will be described.

A reduction gear is incorporated in various machines. A breakdown of the reduction gear may cause a machine in which the reduction gear is incorporated to stop. If it is possible to estimate the life of the reduction gear, in other words, if it is possible to estimate how much longer the reduction gear may be used until the reduction gear breaks down, a stopping time of the machine due to a breakdown of the reduction gear can be shortened.

Rotation is input from a motor to the reduction gear. In the related art, it is possible to estimate the life of the reduction gear to some extent by identifying torque caused by this motor. However, this estimation does not take into account an external load input from an output side of the reduction gear, thereby having a low accuracy.

From the findings described above, the present inventor has devised the life estimation system according to the embodiment. Hereinafter, specific description will be given.

Figure 1:
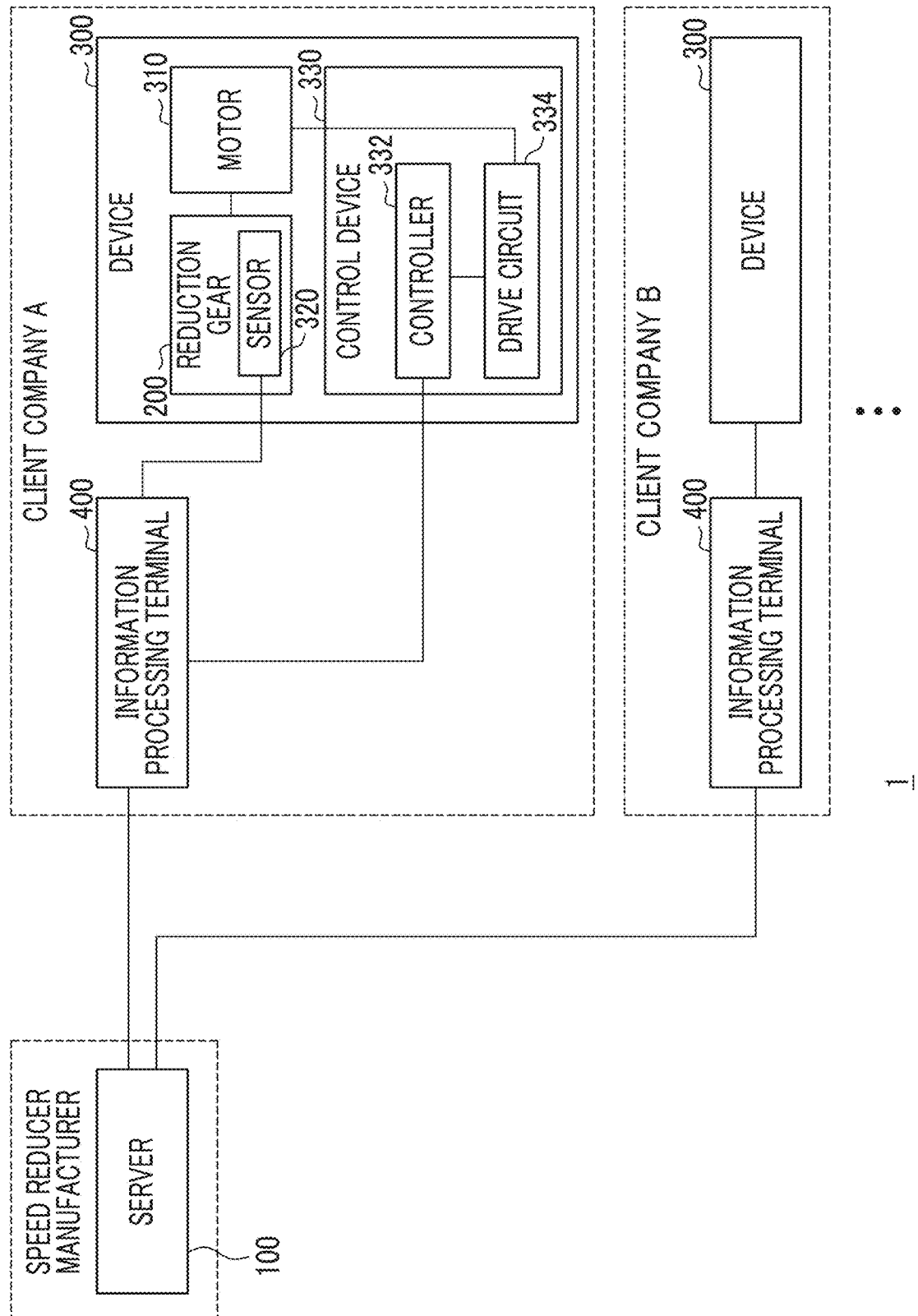
FIG. 1 is a schematic diagram showing a configuration of a life estimation system according to an embodiment.

FIG. 1 is a schematic diagram showing a configuration of a life estimation system 1 according to the embodiment. The life estimation system 1 includes a server 100 managed by a speed reducer manufacturer, a machine 300 that is held by each client company and includes a reduction gear 200, and an information processing terminal 400.

The speed reducer manufacturer is a company that manufactures the reduction gear 200. At the request of a client company, the server 100 estimates the life of a specific part (member) of the reduction gear 200 of the client company and provides the client company with the estimation results.

The client company is a user of the reduction gear 200 manufactured by the speed reducer manufacturer. The client company includes a machine manufacturer that obtains the reduction gear 200, which is manufactured by the speed reducer manufacturer, by purchasing and manufactures the machine 300 by incorporating the obtained reduction gear 200 into the machine and a company that purchases the machine 300 from the machine manufacturer and uses the machine.

Although FIG. 1 shows that each client company has only one machine 300 and only one reduction gear 200 is included in the machine 300, each client company generally holds a plurality of machines 300 in many cases, and each of the machines 300 includes a plurality of reduction gears 200 in many cases. Hereinafter, the reduction gear 200 incorporated in the machine 300 held by a client company A will be described as a representative of the reduction gears.

The machine 300 includes the reduction gear 200, a motor 310, a sensor 320 mounted on the reduction gear 200, and a control device 330 that controls an operation of the motor 310. The motor 310 is a motor that causes torque according to a current value, and is, for example, a servomotor. The reduction gear 200 is a reduction gear manufactured by the speed reducer manufacturer. The reduction gear 200 reduces the speed of rotation input from the motor 310 and outputs the rotation.

The sensor 320 detects information for identifying a stress generated in a specific part of the reduction gear 200. The sensor 320 of the embodiment is a load sensor, and detects a load generated at a predetermined part of the reduction gear 200. The sensor 320 transmits load information indicating a detected load to the information processing terminal 400.

The control device 330 includes a controller 332 and a drive circuit 334. The controller 332 generates a current value instruction indicating a rotation amount (rotation angle) of a rotor of the motor 310, that is, a beam current, and transmits the current value instruction to the drive circuit 334. The controller 332 transmits the current value instruction also to the information processing terminal 400. Instead of transmitting the current value instruction from the controller 332, a value of a current value flowing in the motor 310 may be detected by a sensor or the like and be transmitted to the information processing terminal 400. The drive circuit 334 supplies a drive current according to the current value instruction to the motor 310. The motor 310 rotates the rotor by this drive current.

The information processing terminal 400 is a PC or the like operated by a person in charge in the client company. The information processing terminal 400 holds detection information (load information) from the sensor 320. In addition, the information processing terminal 400 holds the current value instruction from the controller 332.

The person in charge or the like in the client company inputs, into the information processing terminal 400, a request for providing an estimation on how long are the remaining life of a specific part of the reduction gear 200 and the remaining life of the reduction gear 200, in other words, how much longer the reduction gear may be used until a breakdown (hereinafter, called "life estimation provision request") occurs. The information processing terminal 400 transmits the life estimation provision request to the server 100 in addition to the load information and the current value instruction. In the embodiment, the information processing terminal 400 transmits all of load information and current value instructions from the start of use of the reduction gear 200 to the current time point (the latest).

As described above, the server 100 estimates the life of a specific part of the reduction gear 200 according to a life estimation provision request, and transmits the estimation results to the information processing terminal 400 of the client company, which is a requestor. The information processing terminal 400 receives the estimation results transmitted according to the life estimation provision request. The person in charge or the like in the client company learns the remaining life of the reduction gear 200 by checking the estimation results.

Figure 2:
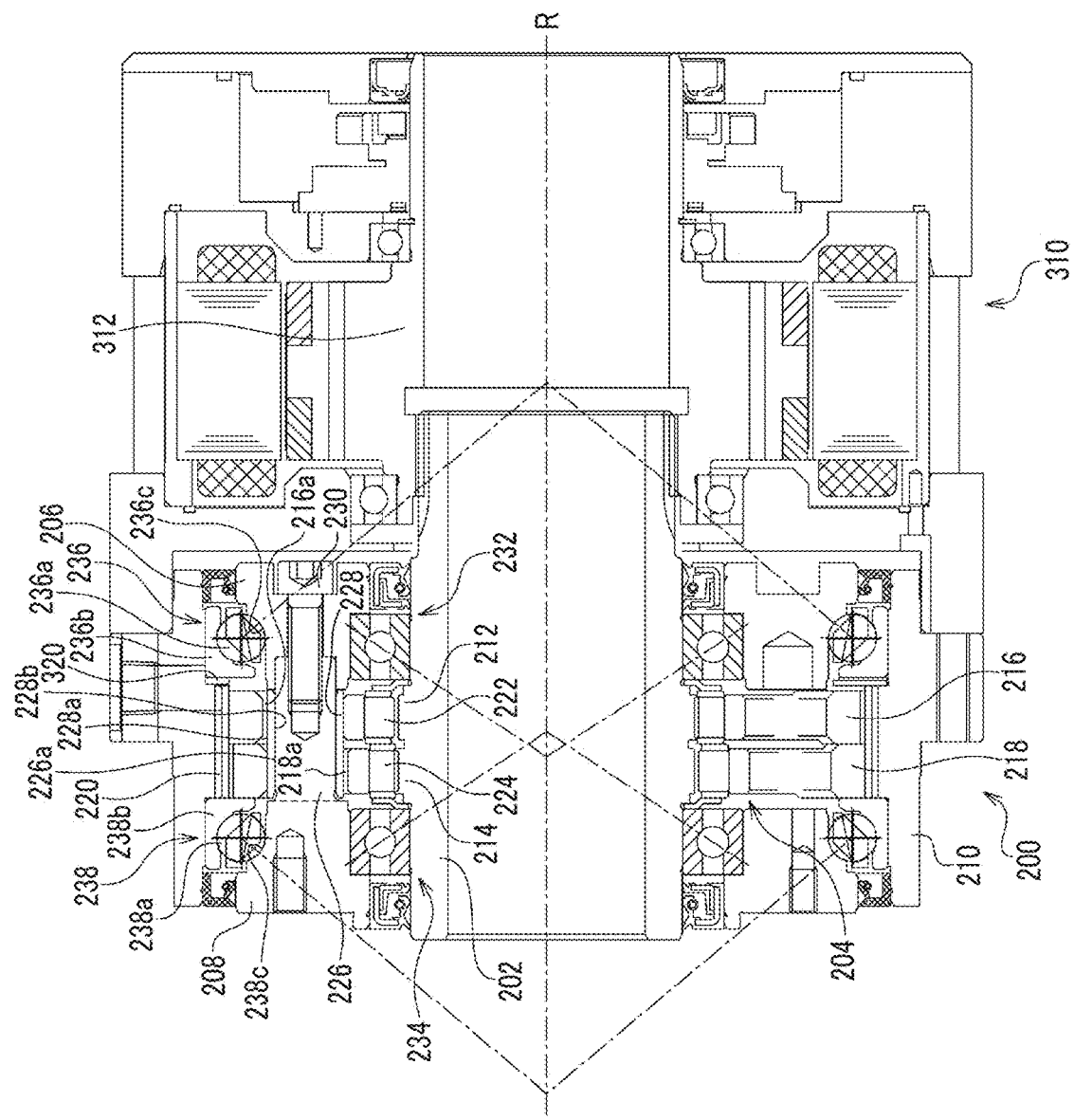
FIG. 2 is a sectional view illustrating a reduction gear and a motor that are incorporated in a machine of FIG. 1.

FIG. 2 is a sectional view illustrating the reduction gear 200 and the motor 310 that are incorporated in the machine 300. The reduction gear 200 of the embodiment is an eccentrically oscillating reduction gear. The reduction gear 200 mainly includes an input shaft 202, a reduction mechanism 204, a first carrier member 206, a second carrier member 208, and a casing 210. The input shaft 202 is connected to a rotor 312 of the motor 310, and receives rotation of the rotor 312 to rotate about a rotation axis R.

The reduction mechanism 204 reduces the speed of rotation transmitted from the rotor 312. The reduction mechanism 204 mainly includes eccentric bodies 212 and 214, external gears 216 and 218, and an internal gear 220. The eccentric bodies 212 and 214 are integrally formed with the input shaft 202. The two external gears 216 and 218 are fitted onto the outer circumferences of the eccentric bodies 212 and 214 via rollers 222 and 224 respectively so as to be capable of oscillating. A plurality of offset through-holes 216a and 218a are formed in the external gears 216 and 218 respectively at positions offset from the center of the shaft. The plurality of offset through-holes 216a and 218a are equidistantly formed in a circumferential direction. An inner pin 226 and an inner roller 228 fitted onto the inner pin 226 pass through the offset through-holes 216a and 218a in an axial direction. A gap corresponding to at most twice the eccentricity of the eccentric bodies 212 and 214 is secured between the inner roller 228 and the offset through-holes 216a and 218a. The inner roller 228 has an outer circumferential surface 228a movably abutting against the offset through-holes 216a and 218a of the external gears 216 and 218 and an inner circumferential surface 228b movably abutting against an outer circumferential surface 226a of the inner pin 226. The internal gear 220 is formed on an inner circumferential surface of the casing 210. The internal gear 220 internally meshes with the external gears 216 and 218. The internal gear 220 is configured by fitting cylindrical outer pins into pin grooves equidistantly formed in the inner circumferential surface of the casing 210. The internal gear 220 may be integrally formed with the inner circumferential surface of the casing 210. The number of internal teeth of the internal gear 220 is slightly (for example, by one) larger than the number of external teeth of the external gears 216 and 218.

The first carrier member 206 is disposed on one side (the right in FIG. 2) of the external gears 216 and 218 in the axial direction. The first carrier member 206 is fastened with the inner pin 226 by a bolt 230. The second carrier member 208 is disposed on the other side (the left in FIG. 2) of the external gears 216 and 218 in the axial direction. In the embodiment, the second carrier member 208 is integrally formed with the inner pin 226. Therefore, the first carrier member 206 and the second carrier member 208 are connected to each other via the inner pin 226.

A bearing 232 is disposed between the first carrier member 206 and the input shaft 202, and a bearing 234 is disposed between the second carrier member 208 and the input shaft 202. The first carrier member 206 and the second carrier member 208 rotatably support the input shaft 202 via the bearings 232 and 234. The bearings 232 and 234 are ball bearings in the illustrated example, but may be other types of bearings.

The casing 210 is a substantially cylindrical member, and encloses the external gears 216 and 218, the first carrier member 206, and the second carrier member 208. A main bearing 236 is disposed between the casing 210 and the first carrier member 206, and a main bearing 238 is disposed between the casing 210 and the second carrier member 208. The casing 210 and the first and second carrier members 206 and 208 are configured to be rotatable relative to each other via the main bearings 236 and 238.

The main bearings 236 and 238 are angular contact ball bearings in the illustrated example, but may be other types of bearings. In a case where the sensor 320 is mounted on a main bearing as will be described later, for example, a bearing in which a thrust component force is generated when a load is received, such as an angular contact ball bearing, is adopted as a main bearing. The main bearings 236 and 238 include rolling elements 236a and 238a respectively and outer rings 236b and 238b respectively, but do not include inner rings. Instead, a rolling surface 236c is formed on an outer circumference of the first carrier member 206 and functions as an inner ring of the main bearing 236. A rolling surface 238c is formed on an outer circumference of the second carrier member 208 and functions as an inner ring of the main bearing 238. Without being limited to such a configuration, the main bearing may separately have an inner ring.

When the input shaft 202 rotates, the reduction mechanism 204 reduces the speed of the rotation of the input shaft 202, and the rotation is transmitted to the second carrier member 208 or the casing 210. At this time, the eccentric bodies 212 and 214, which are integrally formed with the input shaft 202, rotate, and the external gears 216 and 218 oscillate via the rollers 222 and 224, in the reduction mechanism 204. Due to this oscillation, meshing positions between the external gears 216 and 218 and the internal gear 220 shift in turn.

Since the number of the teeth of the external gears 216 and 218 are smaller than the number of the teeth of the internal gear 220 by one, the phase of each of the external gears 216 and 218 shifts (spins) by one tooth (that is, an amount corresponding to a difference in the number of teeth) with respect to the internal gear 220 each time the input shaft 202 rotates once. This spinning component is transmitted to the inner pin 226 via motion between the offset through-holes 216a and 218a of the external gears 216 and 218 and the inner roller 228 and motion between the inner circumferential surface 228b of the inner roller 228 and the outer circumferential surface 226a of the inner pin 226, and the second carrier member 208 integrally formed with the inner pin 226 rotates relative to the casing 210 at a rotation speed which has reduced to 1/(the number of the teeth of the internal gear). Therefore, the second carrier member 208 rotates in a case where the casing 210 is fixed, and the casing 210 rotates in a case where the second carrier member 208 is fixed.

The sensor 320 is mounted on a part, to which an external load input from the output side is transmitted without passing through the reduction mechanism 204, out of respective parts of the reduction gear 200. Therefore, the sensor 320 is mounted (fixed) on, for example, the main bearings 236 and 238, the first carrier member 206, the second carrier member 208, or the casing 210. In the illustrated example, the sensor 320 is mounted on a side surface (on an internal gear side in the axial direction) of the outer ring 236b of the main bearing 236, and is sandwiched between the side surface of the outer ring 236b and a stepped portion of the casing 210. When an external load is applied to a member of the reduction gear 200 on the output side, a thrust component force is generated at the main bearing 236, which is an angular contact ball bearing. The sensor 320 detects the thrust component force as load information.

Figure 3:
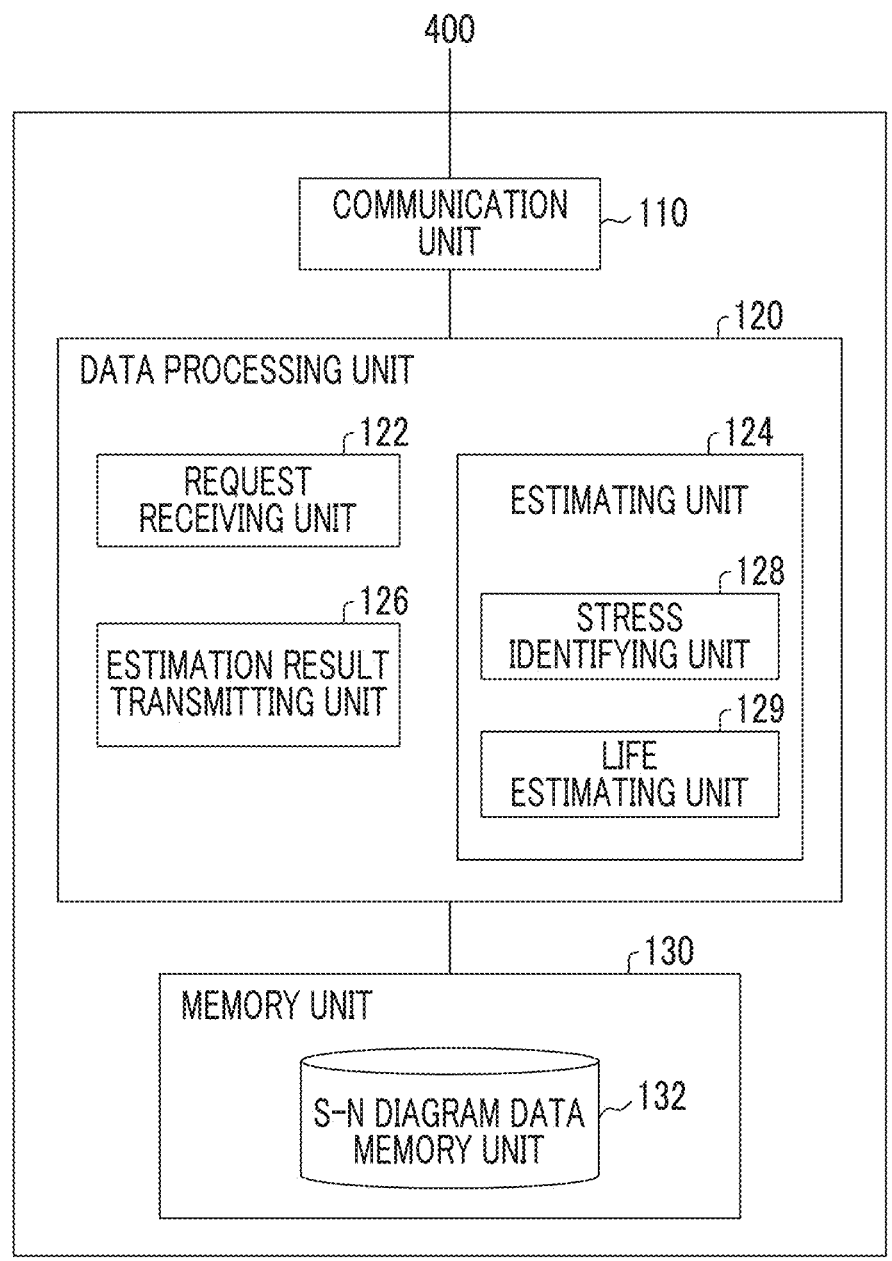
FIG. 3 is a block diagram showing a function and a configuration of a server of FIG. 1.

FIG. 3 is a block diagram showing a function and a configuration of the server 100. Each block shown herein can be realized by an element or a mechanical device such as a central processing unit (CPU) of a computer in a hardware aspect, and can be realized by a computer program in a software aspect. Herein, however, each block is expressed as a functional block realized in combination of hardware and software aspects. Therefore, it is clear for those skilled in the art who have learned about the specification that the functional blocks can be realized in a variety of forms in combinations of hardware and software.

The server 100 includes a communication unit 110 that communicates with an external device in accordance with a predetermined communication protocol, a data processing unit 120 that executes various types of data processing for life estimation, and a memory unit 130, which is a memory region for data to be updated or referred by the data processing unit 120. The data processing unit 120 transmits and receives data to and from the information processing terminal 400 via the communication unit 110.

The memory unit 130 includes an S-N diagram data memory unit 132 that stores data of an S-N diagram about a specific part of the reduction gear 200.

The S-N diagram data memory unit 132 stores data of an S-N diagram about a specific part on an input side of the reduction mechanism. The S-N diagram data memory unit 132 may store data of an S-N diagram about a plurality of parts on the input side, or may store only data of an S-N diagram about the most fragile part, out of respective parts on the input side. Although a specific part on the input side is not particularly limited herein, for example, the specific part may be an internal part nearby the eccentric bodies 212 and 214.

In addition, the S-N diagram data memory unit 132 stores data of an S-N diagram about a specific part on the output side of the reduction mechanism. The S-N diagram data memory unit 132 may store data of an S-N diagram about a plurality of parts on the output side, or may store only data of an S-N diagram about the most fragile part, out of respective parts on the output side. Although a specific part on the output side is not particularly limited herein, for example, the specific part may be a root portion of the inner pin 226 on a second carrier member 208 side or an internal part nearby the inner ring of the main bearing 238.

Data of an S-N diagram is prepared in advance, for example, by experiments or the like. The most fragile part on each of the input side and the output side may be identified by experiments or the like. Herein, the data (information) of the S-N diagram is information indicating a relationship between a stress repeatedly applied at a constant amplitude and the number of times of repeated loading up until rupture, in fatigue fracture of a material, and does not necessarily have to be graph data.

The data processing unit 120 includes a request receiving unit 122, an estimating unit 124, and an estimation result transmitting unit 126. The request receiving unit 122 receives load information and current value instructions in addition to a life estimation provision request from the information processing terminal 400.

The estimating unit 124 estimates the life of a specific part of the reduction gear 200 when the request receiving unit 122 receives a life estimation provision request. The estimating unit 124 includes a stress identifying unit 128 and a life estimating unit 129.

The stress identifying unit 128 identifies a stress generated in a specific part on the input side based on a current value instruction. For example, the stress identifying unit 128 identifies torque caused by the motor 310 based on a current value indicated by the current value instruction. Then, the stress identifying unit 128 identifies a stress (for example, all of individual stresses generated from the start of use of the reduction gear 200 to the current time point) generated in a specific part based on a correlation identified in advance, which is a correlation between torque caused by the motor 310 and a stress generated in the specific part by the torque. The correlation may be in the form of a table indicating a relationship between torque and a stress, or a conversion expression for converting torque into a stress. The stress identifying unit 128 may identify stresses of a plurality of parts on the input side, or may identify a stress of the most fragile part on the input side.

The stress identifying unit 128 identifies a stress generated in a specific part on the output side based on load information. For example, the stress identifying unit 128 identifies a stress (for example, individual stresses corresponding to all pieces of load information generated from the start of use of the reduction gear 200 to the current time point) generated in the specific part based on a correlation identified in advance, which is a correlation between a load generated in a part on which the sensor 320 is mounted (that is, a load detected by the sensor 320) and a stress generated in the specific part. The correlation may be in the form of a table indicating a relationship between a load and a stress, or a conversion expression for converting a load into a stress. The stress identifying unit 128 may identify stresses of a plurality of parts on the output side, or may identify a stress of the most fragile part on the output side.

With reference to data of an S-N diagram stored in the S-N diagram data memory unit 132, the life estimating unit 129 estimates the life of a specific part of the reduction gear 200 based on a stress identified by the stress identifying unit 128. A known method can be used as a method of estimating a life based on each stress value identified by the stress identifying unit 128 and data of an S-N diagram. In a case where stresses generated in a plurality of parts on each of the input side and the output side are identified, the life estimating unit 129 may estimate the life of each of the plurality of parts. In a case where only a stress generated in the most fragile part on each of the input side and the output side is identified, the life estimating unit 129 may estimate the life of the most fragile part.

The estimation result transmitting unit 126 transmits life estimation results obtained by the estimating unit 124 to the information processing terminal 400 of a requestor. In a case where the life of each of a plurality of parts is estimated, the estimation result transmitting unit 126 may transmit estimation results of the plurality of parts. In a case where only the life of the most fragile part is estimated, the estimation result transmitting unit 126 may transmit estimation results of the input side and the output side, or may transmit only estimation results of a side having a shorter life out of the estimation results of the input side and the output side.

An operation of the life estimation system 1 having the configuration will be described. The information processing terminal 400 transmits a life estimation provision request to the server 100 in response to an input by a person in charge or the like in the client company. At this time, the information processing terminal 400 transmits load information and current value instructions in addition to the life estimation provision request. The server 100 identifies a stress of a specific part of the reduction gear 200 when receiving a life estimation provision request. Specifically, the server 100 identifies a stress generated in a specific part on the input side based on a current value indicated by a current value instruction, that is, the value of a current supplied to the motor 310. In addition, the server 100 identifies a stress generated in a specific part on the output side based on load information. With reference to data of an S-N diagram, the server 100 estimates the life of a specific part based on an identified stress. The server 100 transmits estimation results to the information processing terminal 400 of a requestor. The person in charge or the like in the client company can learn the life of a specific part of the reduction gear 200 and the life of the reduction gear 200 by checking the transmitted estimation results. Accordingly, it is possible to reduce the occurrence of operation stop of the machine to the minimum by performing maintenance or replacement before a breakdown.

In the life estimation system 1 described above, the life of a part on the input side of the reduction mechanism 204 is identified based on a drive current supplied to the motor 310, that is, based on torque caused by the motor 310. On the other hand, the life of a part on the output side of the reduction mechanism 204, to which an external load is applied, is identified based on load information from the sensor 320 mounted on a part to which the external load is transmitted without passing through the reduction mechanism 204. That is, the life estimation system 1 can estimate also the life of a part on the output side in addition to the life of a part on the input side of the reduction mechanism 204 in a relatively accurate manner. Therefore, the life estimation system can estimate the life of the reduction gear 200 in a more accurate manner than the related art can.

Hereinbefore, the life estimation system according to the embodiment has been described. The embodiment is merely an example. It is clear for those skilled in the art that a variety of modification examples can be made in combination of respective configuration elements or respective processes, and such modification examples also fall within the scope of the invention. Modification examples are as follows.

Modification Example 1

Figure 4:
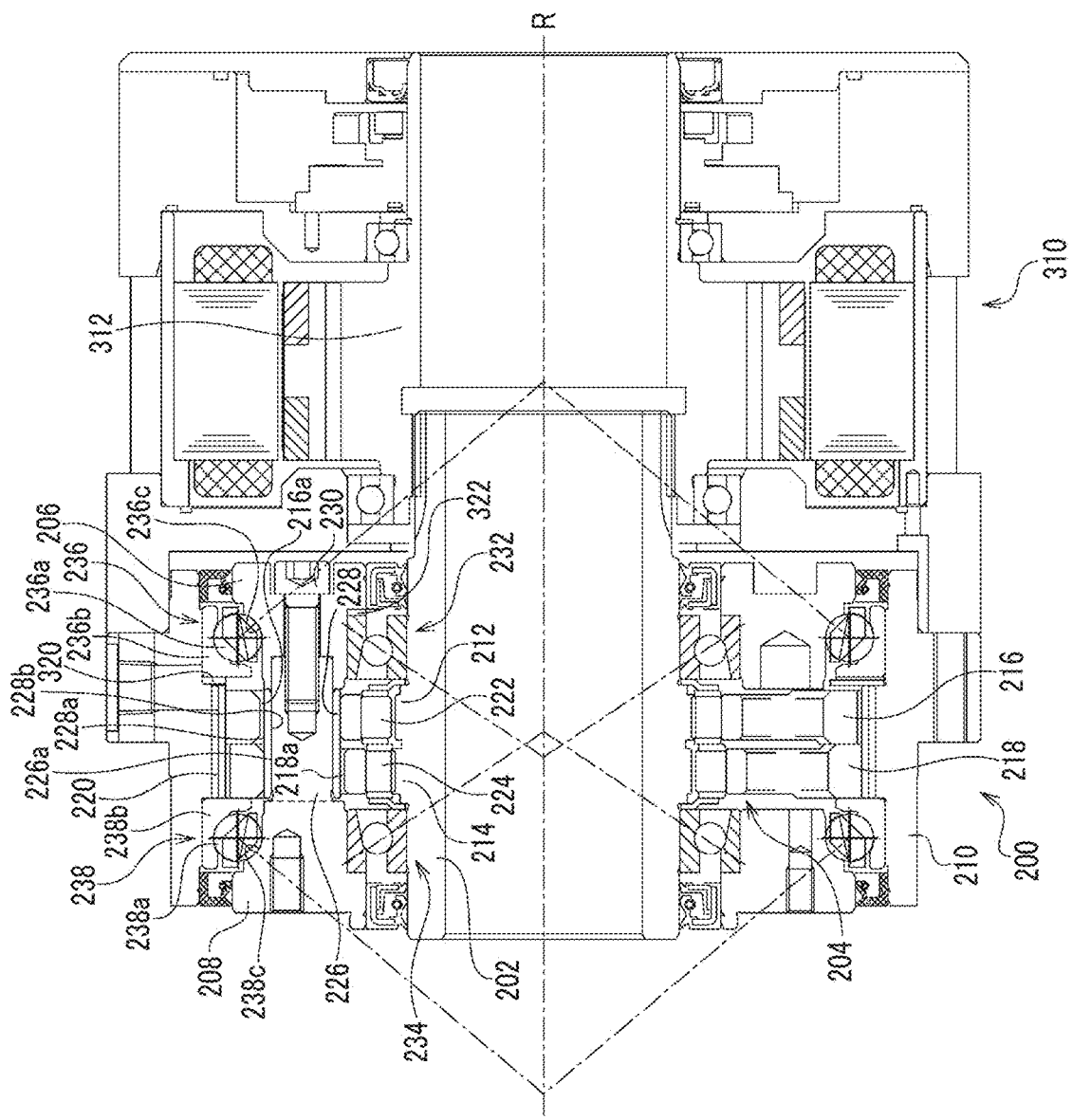
FIG. 4 is a sectional view of a reduction gear and a motor according to a modification example.

FIG. 4 is a sectional view illustrating the reduction gear 200 and the motor 310 according to a modification example. FIG. 4 corresponds to FIG. 2 of the embodiment. A main difference from the embodiment is that a sensor is mounted also on the input side of the reduction gear 200 and a stress generated in a specific part on the input side is identified based on detection information obtained by the sensor. Hereinafter, a difference from the embodiment will be mainly described.

In the modification example, a pair of the bearings 232 and 234 is angular contact ball bearings. The pair of bearings 232 and 234 may be other types of bearings insofar as the bearings are bearings in which a thrust component force is generated when a load is received.

In addition, the life estimation system further includes a sensor 322 in the modification example. As the sensor 320, the sensor 322 is a load sensor. The sensor 322 is mounted onto a part, to which a load generated by torque that is caused by the motor 310 is transmitted without passing through the reduction mechanism 204, out of respective parts of the reduction gear 200. Therefore, for example, the sensor 322 is mounted onto the input shaft 202, the eccentric bodies 212 and 214, or the bearings 232 and 234. In the illustrated example, the sensor 322 is mounted on a side surface of the outer ring of the bearing 232, and is sandwiched between a side surface (side surface on a motor side in the axial direction) of the outer ring and a stepped portion of the first carrier member 206. When an external load is applied to a member of the reduction gear 200 on the input side, a thrust component force is generated at the bearing 232, which is an angular contact ball bearing. The sensor 322 detects the thrust component force. The sensor 322 transmits load information indicating a detected load (thrust component force) to the information processing terminal 400.

The information processing terminal 400 transmits a life estimation provision request to the server 100 based on an input by a person in charge or the like in the client company. At this time, unlike in the embodiment, the information processing terminal 400 transmits load information from each sensor in addition to the life estimation provision request. That is, the information processing terminal 400 transmits the load information from the sensor 322 instead of transmitting a current value instruction.

Unlike in the embodiment, the stress identifying unit 128 of the modification example identifies a stress generated in a specific part on the input side based on load information detected by the sensor 322 instead of a current value indicated by a current value instruction. A method for the stress identifying unit 128 to identify a stress generated in a specific part on the input side based on load information from the sensor 322 is the same as a method of identifying a stress generated in a specific part on the output side based on load information from the sensor 320.

Modification Example 2

Although a case where the stress identifying unit 128 identifies a stress generated in a specific part on the output side based on load information has been described in the embodiment, without being limited thereto, the stress may be identified based on both of load information and a current value instruction (that is, torque caused by the motor 310). In addition, although a case where the stress identifying unit 128 identifies a stress generated in a specific part on the input side based on a current value indicated by a current value instruction has been described in the embodiment, without being limited thereto, the stress generated in the specific part on the input side may be identified based on both of a current value instruction and load information in a case where a sensor is mounted also on the input side as in Modification Example 1.

Modification Example 3

A case where the sensor 320 is a load sensor has been described in the embodiment and the modification example. In addition, a case where the sensor 322 is a load sensor has been described in Modification Example 1 described above. Without being limited thereto, however, the sensors may be sensors that detect information for identifying a stress generated in a specific part of the reduction gear 200, and may be, for example, strain sensors detecting strain or other sensors.

Modification Example 4

Although a case where the life estimation system 1 includes only one sensor 320 as a sensor that detects information for identifying a stress generated in a specific part on the output side has been described in the embodiment and the modification examples, the life estimation system is not limited thereto. The life estimation system 1 may include a plurality of sensors 320. In this case, each of the plurality of sensors 320 is mounted on a part, to which an external load input from the output side is transmitted without passing through the reduction mechanism 204, out of respective parts of the reduction gear 200. The stress identifying unit 128 identifies a stress generated in a specific part based on load information from each of the sensors 320. For example, a correlation between a load generated in a part on which each of the sensors 320 is mounted (that is, a load detected by each of the sensors 320) and a stress generated in a specific part is identified for each of the sensors 320. The stress identifying unit 128 identifies a stress generated in a specific part based on a correlation for each of the sensors 320 and load information from each of the sensors 320. The stress identifying unit 128 identifies, for example, an average value of respective stresses identified based on load information from each of the sensors 320 as a stress generated in a specific part. In addition, for example, to identify a stress, load information from which sensor 320 is to be based on may be determined for each specific part. In this case, the memory unit 130 stores a correspondence relationship between a specific part and any sensor 320 out of the plurality of sensors 320. Based on this correspondence relationship, the stress identifying unit 128 determines, for each specific part, that to identify a stress, load information from which sensor 320 is to be based on.

In addition, although a case where the life estimation system 1 includes only one sensor 322 as a sensor that detects information for identifying a stress generated in a specific part on the input side has been described in Modification Example 1, the life estimation system is not limited thereto. The life estimation system 1 may include a plurality of sensors 322. In this case, each of the plurality of sensors 322 is mounted onto a part, to which a load generated by torque that is caused by the motor 310 is transmitted without passing through the reduction mechanism 204, out of respective parts of the reduction gear 200. The stress identifying unit 128 identifies a stress generated in a specific part based on load information from the plurality of sensors 322 or based on load information from a specific sensor 322 out of the plurality of sensors 322, as in the case of identifying a stress generated in a specific part on the output side.

Modification Example 5

Although a case where the information processing terminal 400 transmits all of load information and current value instructions from the start of use to the present to the server 100, the server 100 identifies a stress generated in a specific part of the reduction gear 200 based on all of the load information and the current value instructions, and the life of the specific part is estimated has been described in the embodiment, the invention is not limited thereto. The information processing terminal 400 may transmit load information and current value instructions for a certain period of time to the server 100, the server 100 may identify a stress generated in a specific part of the reduction gear 200 based on the load information and the current value instructions for the certain period of time, and the life of the specific part may be estimated.

For example, in a case where the machine 300 is a machine that incessantly repeats the same operation, the reduction gear 200 incorporated in the machine 300 incessantly repeats the same operation as well. In this case, the information processing terminal 400 may transmit load information and current value instructions for a certain period of time, for example, for a period of one time or a plurality of times of repeated operations and a period of use up until the present to the server 100. The stress identifying unit 128 may identify a stress generated in a specific part from the start of use to the present based on load information and current value instructions for a certain period of time and a period of use.

Modification Example 6

Although a case where the reduction gear 200 is an eccentrically oscillating reduction gear has been described in the embodiment, the type of the reduction gear is not particularly limited. The reduction gear 200 may be other types of reduction gears, for example, a deflection meshing reduction gear, a planetary reduction gear, and the like.

Modification Example 7

Although a case where the server 100 estimates a life has been described in the embodiment, a device that estimates a life is not particularly limited. For example, the information processing terminal 400 may estimate a life, or a processing terminal provided in each reduction gear 200 or each motor 310 may estimate a life.

Modification Example 8

Although a case where a life is estimated with the use of data of an S-N diagram has been described in the embodiment, a method is not limited thereto. The method is not particularly limited insofar as a life is estimated based on a stress generated in a specific part.

Any combination of the embodiment and the modification examples described above can also be used as an embodiment of the invention. A new embodiment generated by combination has an effect of each of the embodiment and the modification examples that are combined. In addition, it is also clear for those skilled in the art that a function to be carried out by each configuration requirement described in the claims is realized by a single or a combination of respective configuration elements described in the embodiment and the modification examples.

It should be understood that the invention is not limited to the above-described embodiment, but may be modified into various forms on the basis of the spirit of the invention. Additionally, the modifications are included in the scope of the invention.

What is claimed is:

1. A life estimation system that estimates a life of a reduction gear including a reduction mechanism, the system comprising:
    a sensor that is mounted onto the reduction gear and detects information for identifying a stress generated in a specific part of the reduction gear; and
    an estimator that identifies the stress generated in the specific part based on detection information obtained by the sensor and estimates a life of the specific part based on the identified stress,
    wherein:
        the sensor is mounted onto a part to which a load input from an output side of the reduction mechanism is transmitted without passing through the reduction mechanism,
        the estimator estimates a life of a specific part on the output side of the reduction mechanism based on detection information obtained by the sensor,
        the reduction gear reduces a speed of rotation of a motor and outputs the rotation, and
        the estimator estimates a life of a specific part on an input side of the reduction mechanism based on a value of a current supplied to the motor.

2. The life estimation system according to claim 1, further comprising:
    another sensor that is mounted onto a part, to which a load generated by torque input by to the reduction gear is transmitted without passing through the reduction mechanism, and is different from the sensor,
    wherein the estimator estimates a life of a specific part on an input side of the reduction mechanism based on detection information obtained by the another sensor.

3. The life estimation system according to claim 2, wherein the other sensor detects a load generated in a bearing of the reduction mechanism.

4. The life estimation system according to claim 3, wherein the bearing is a bearing in which a thrust component force is generated when a load is received, and the other sensor detects the thrust component force generated in the bearing of the reduction mechanism.

5. The life estimation system according to claim 4, wherein the reduction mechanism includes an input shaft and an input bearing which supports the input shaft, and the input bearing is the bearing in which a thrust component force is generated when a load is received.

6. The life estimation system according to claim 5, wherein the reduction mechanism includes an internal gear which is formed in the casing, external gears which internally mesh with the internal gear, a carrier member which is disposed on one side of the external gears in the axial direction, and
    wherein the input bearing is disposed between the input shaft and the carrier member, and
    the other sensor is sandwiched between the outer ring of the input bearing and the carrier member.

7. The life estimation system according to claim 1, wherein the sensor detects a load generated in a bearing of the reduction gear.

8. The life estimation system according to claim 7, wherein the bearing is a bearing in which a thrust component force is generated when a load is received, and the sensor detects the thrust component force generated in the bearing.

9. The life estimation system according to claim 8, wherein the reduction mechanism includes an internal gear which is formed in the casing, external gears which internally mesh with the internal gear, a carrier member which is disposed on one side of the external gears in the axial direction, and a main bearing which is disposed between the casing and the carrier member, and
    the main bearing is the bearing in which a thrust component force is generated when a load is received.

10. The life estimation system according to claim 9, wherein the sensor is sandwiched between an outer ring of the main bearing and the casing.

11. The life estimation system according to claim 1, wherein the estimator estimates a life based on a stress identified for the specific part and information of an S-N diagram related to the specific part.

12. The life estimation system according to claim 1, further comprising:
    a controller that generates a current value instruction indicating the value of the current supplied to the motor,
    wherein the estimator estimates a life of the specific part on the input side of the reduction mechanism based on the value of the current indicated by the current value instruction generated by the controller.

13. The life estimation system according to claim 12, further comprising:
    an information processing terminal that receives detection information from the sensor and receives the current value instruction from the controller; and
    a server that receives the detection information and the current value instruction from the information processing terminal,
    wherein:
    the information processing terminal stores the detection information of the sensor and the current value instruction for a certain period of time, and transmits a life estimation provision request which includes the detection information of the sensor and the current value instruction for the certain period of time to the server, and
    the server estimates the life of the specific part on the input side and the life of the specific part on the output side of the reduction mechanism based on the detection information obtained by the sensor and the current value instructions for the certain period of time which are included in the life estimation provision request.

* * * * *